Dec. 5, 1950       H. W. STEEN         2,532,961
METHOD OF TYING FLIES
Filed Aug. 27, 1946

Inventor
H. W. Steen
By CA Knowles
Attorneys.

Patented Dec. 5, 1950

2,532,961

UNITED STATES PATENT OFFICE 2,532,961

METHOD OF TYING FLIES

Howard W. Steen, Doniphan, Mo.

Application August 27, 1946, Serial No. 693,316

1 Claim. (Cl. 43—42.53)

This invention relates to flies used as artificial bait, and a method of tying the same.

The primary object of the invention is to provide a method of tying flies which will insure against the hooks moving with respect to each other when a fish is caught thereon, to impair the efficiency of the hook.

Another object of the invention is to secure a pair of hooks in the construction of a fly, so that the hooks will be maintained in their proper spaced relation with respect to each other.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawing.

Figure 1:
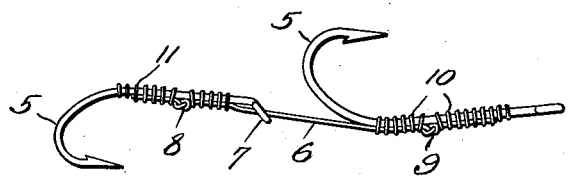
Figure 1 is an elevational view illustrating a pair of hooks as connected and tied in accordance with the present method of tying flies.
Figure 2:
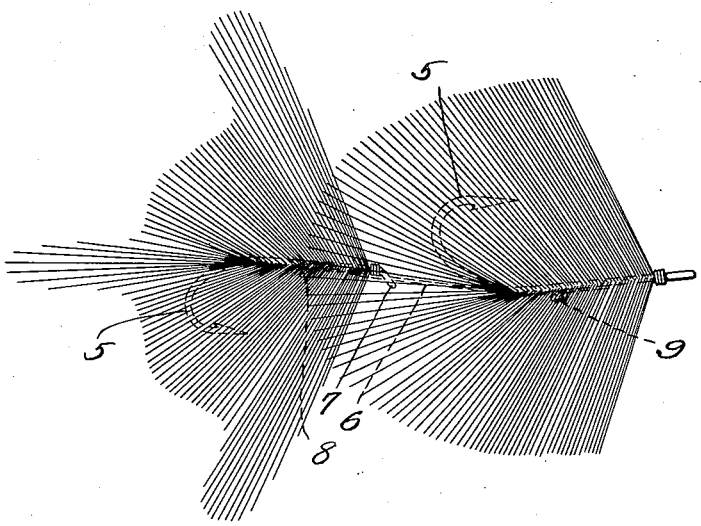
Figure 2 is a view illustrating the hackle feathers as secured to the hooks.

Referring to the drawing in detail, the method forming the subject matter of the present invention embodies providing a pair of fish hooks such as indicated at 5, arranging the fish hooks so that the hook ends thereof are extended in opposite directions.

A nylon leader such as indicated at 6 is provided, the nylon leader being extended through the eye 7 of one hook member with the knot 8 thereof spaced an appreciable distance from the eye 7. The opposite end of the nylon leader 6, which is also formed with a knot indicated at 9, is positioned along the shank of the adjacent hook and is secured by wrapping winding silk around the nylon leader binding the nylon leader to the shank of the hook, the winding silk being indicated by the reference character 10.

Winding silk such as indicated at 11 is wound around the shank of the outermost hook, and the nylon leader, at opposite sides of the knot 8 securing the nylon leader to the hook in such a way as to prevent movement of the hooks with respect to the nylon leader under the severest pull directed to the hook.

After the hooks have been firmly secured to the nylon leader, cement is applied, and the hackle feathers are securely tied to the shanks of the hooks adjacent to the eyes, to conceal the hooks.

By using the method constituting the subject matter of the present invention, it has been found that the hooks are rigidly secured together, against slippage to the end that the hooks and the hackle feathers will be maintained in their proper positions on the nylon leader at all times.

Having thus described the invention, what is claimed is:

The method of tying flies consisting of providing hooks with line eyes, providing a leader, forming knots adjacent the ends of the leader, extending the leader through the eye of one of the hooks placing the leader against the hooks parallel thereto, securing the leader to the hooks by wrapping thread around the hooks and leader at opposite sides of the knots binding the hooks and leader together, coating the hooks and leader with cement, and finally securing hackle feathers to the hooks, concealing the hooks.

HOWARD W. STEEN.

REFERENCES CITED

The following references are of record in the file of this patent:

UNITED STATES PATENTS

| Number | Name | Date |
|---|---|---|
| 469,016 | Hemenway | Feb. 16, 1892 |
| 1,592,600 | Hickman | July 13, 1926 |
| 2,082,305 | Strong | June 1, 1937 |
| 2,130,948 | Carothers | Sept. 20, 1938 |
| 2,290,459 | Weller | July 21, 1942 |